(12) United States Patent
Bringuier et al.

(10) Patent No.: US 6,304,701 B1
(45) Date of Patent: Oct. 16, 2001

(54) DRY FIBER OPTIC CABLE

(75) Inventors: Anne G. Bringuier, Taylorsville; Kevin T. White, Hickory, both of NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/049,417

(22) Filed: Mar. 27, 1998

(51) Int. Cl.⁷ ................................................. G02B 6/44
(52) U.S. Cl. .......................... 385/106; 385/100; 385/103
(58) Field of Search ................................. 385/100–113; 174/23 R

(56) References Cited

U.S. PATENT DOCUMENTS

| | | | |
|---|---|---|---|
| 4,401,366 | 8/1983 | Hope | 350/96.23 |
| 4,587,308 | 5/1986 | Makita et al. | 525/373 |
| 4,758,617 | 7/1988 | Tanioku et al. | 524/413 |
| 4,815,813 * | 3/1989 | Arroyo et al. | 385/102 |
| 4,947,679 | 8/1990 | McGee et al. | 73/64.1 |
| 5,179,611 | 1/1993 | Umeda et al. | 385/110 |
| 5,213,893 * | 5/1993 | Kobayashi et al. | 428/402 |
| 5,306,641 | 4/1994 | Saccocio | 436/85 |
| 5,321,788 | 6/1994 | Arroyo et al. | 385/109 |
| 5,322,896 | 6/1994 | Ueda et al. | 525/119 |
| 5,373,100 * | 12/1994 | Arroyo et al. | 174/23 R |
| 5,389,442 * | 2/1995 | Arroyo et al. | 428/396 |
| 5,399,591 | 3/1995 | Smith et al. | 521/53 |
| 5,410,629 | 4/1995 | Arroyo | 385/109 |
| 5,422,973 | 6/1995 | Ferguson et al. | 385/112 |
| 5,462,972 | 10/1995 | Smith et al. | 521/53 |
| 5,561,729 | 10/1996 | Parris | 385/113 |
| 5,563,218 | 10/1996 | Rebre et al. | 525/253 |
| 5,630,003 | 5/1997 | Arroyo | 385/113 |
| 5,635,569 | 6/1997 | Sackmann et al. | 525/367 |
| 5,642,452 | 6/1997 | Gravely et al. | 385/113 |
| 5,649,041 | 7/1997 | Clyburn, III et al. | 385/109 |
| 5,684,904 | 11/1997 | Bringuier et al. | 385/109 |
| 5,689,601 | 11/1997 | Hager et al. | 385/100 |
| 5,698,615 | 12/1997 | Polle | 523/173 |

OTHER PUBLICATIONS

Swift adhesives Product Data; Swift's 2H547 Hot Melt Coating with MSDS (pp.1–4) Apr. 1997.
Technical Information, Thermoplastic Non–ionic Water–Absorbent Polymer "AQUA CAULK"; Sumitomo Seika Chemical Co., Ltd., May 17, 1995.
Product Literature, Water Swellable Coated Yarns, Fiberline, TB–004, 10–31–96/04.

* cited by examiner

*Primary Examiner*—Brian Healy
*Assistant Examiner*—Juliana K. Kang
(74) *Attorney, Agent, or Firm*—Timothy J. Aberle

(57) ABSTRACT

A mixture of two water receptive agents. One of the water receptive agents is a mixture of two distinct superabsorbent substances, at least one of the superabsorbent substances is characterized by a very fast swelling rate whereby it is operative to quickly block the flow of water, and another of the superabsorbent substances is characterized by a high gel strength whereby it is operative to inhibit wicking. The other of the water receptive agents is a water soluble or a hydrophilic resin for enhancing the performance of the superabsorbent substances. An exemplary fiber optic cable (10) includes fiber optic cable components in the form of buffer tubes (25) having two co-extruded layers (26,27). Layer (26) is the mixture of the two water receptive agents.

19 Claims, 4 Drawing Sheets

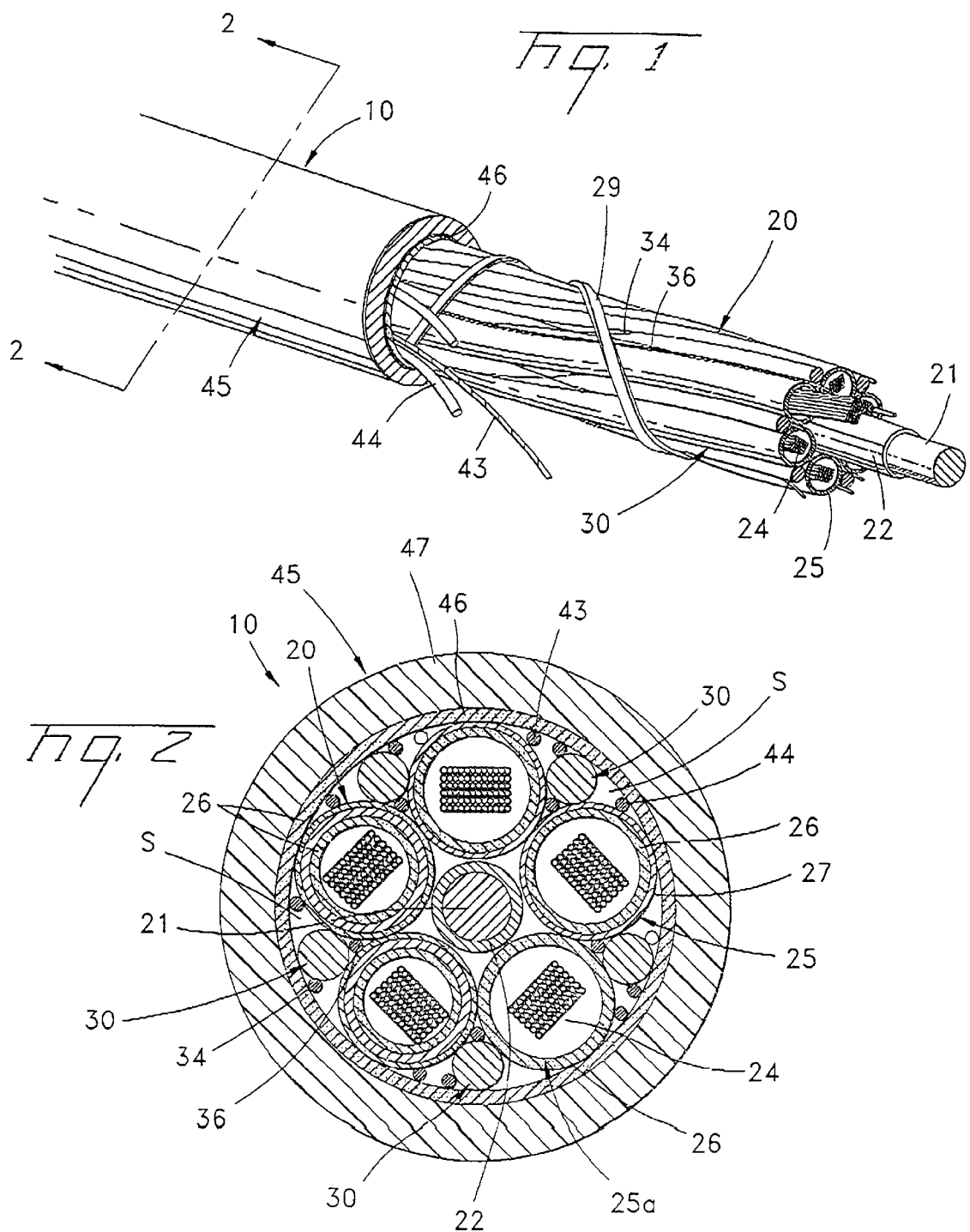

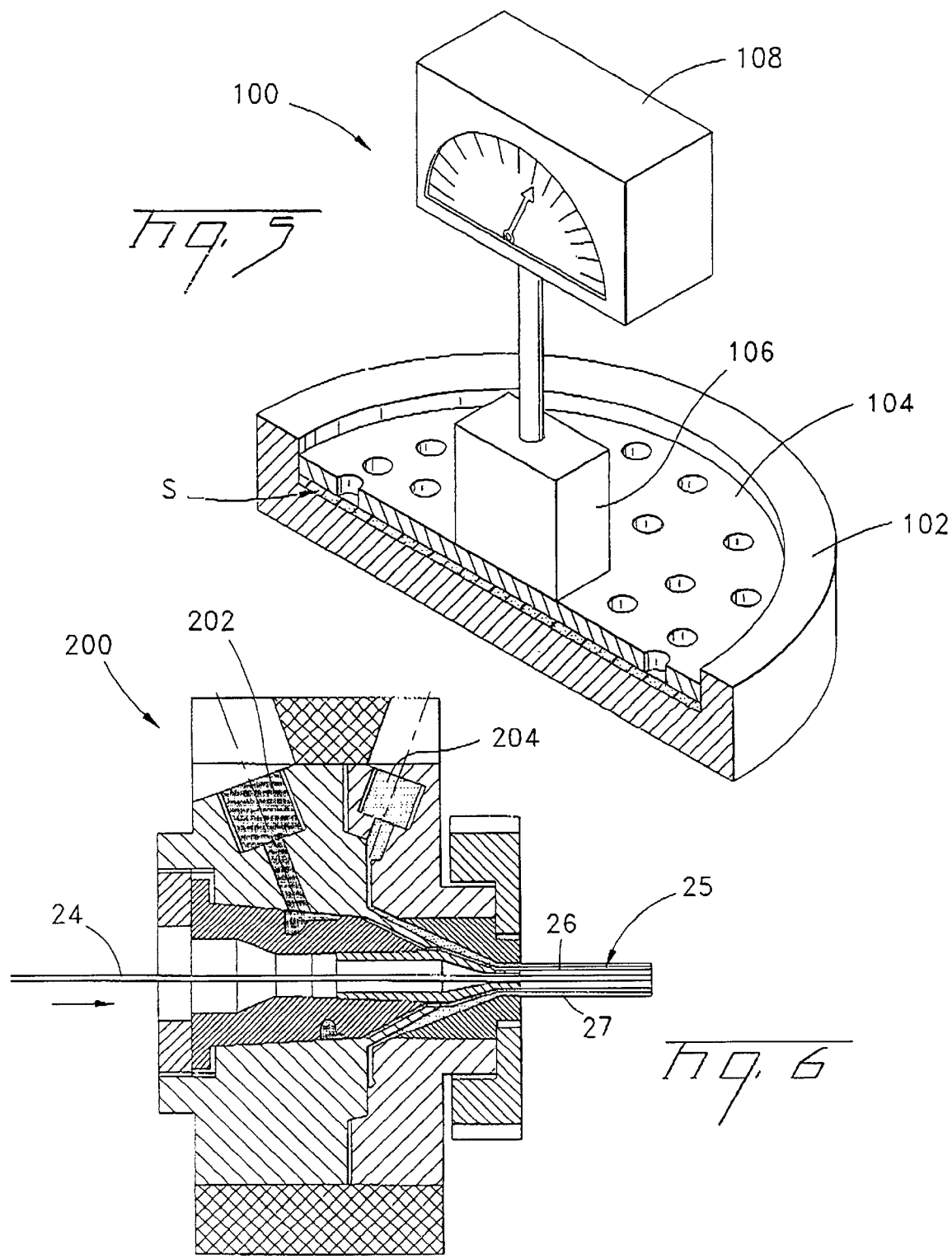

DRY FIBER OPTIC CABLE

The present invention relates to fiber optic cables and, more particularly, to water blocking features of fiber optic cables.

Fiber optic cables include optical fibers which transmit information in cable television, computer, power, and telephone systems. A fiber optic cable may be installed in an environment where the cable is exposed to water. The migration of water in a fiber optic cable may occur where the cable jacket has been breached and water enters the cable. The migration of water in a cable may cause the flooding of a cable passageway or enclosure, and/or it may negatively affect the performance of the optical fibers. As a typical maximum optical fiber packing factor in a buffer or a core tube is about 30%, the tubes present potential water migration paths. Moreover, the grooves of slotted rods present potential water migration paths.

To block the flow of water in a cable, known fiber optic cables may include a hard to remove and messy flooding or filling compound, and/or a more craft-friendly, dry water absorbent chemical. A typical water absorbent chemical includes a polymer chain with reaction sites that react with water, thereby transforming the water absorbent chemical into an expanded mass of viscous gel. The viscous gel acts as a physical barrier to the migration of water.

A fiber optic cable has been developed by the assignee hereof which eliminates the necessity for a flooding compound. U.S. Pat. No. 5,649,041 discloses buffer tubes that include exterior surfaces treated with a water absorptive adhesive which bonds a water swellable powder to the exterior surfaces of the tubes. Although the water swellable powder and water absorptive adhesive block the flow of water outside of the buffer tubes, a filling compound may be needed inside the buffer tubes to block the flow of water therein.

U.S. Pat. No. 5,179,611 discloses a slotted rod type fiber optic cable that includes a water absorptive tape wrapped around the slotted rod. The tape is a non-woven fabric, a paper or other sheet-like material, which is topically coated or impregnated with a combination of a thermoplastic elastomer binding agent, and a water absorptive resin combined with a water soluble resin. The water soluble resin is described as having a high rate of dissolution so that it will dissolve and thereby free the water absorptive resin for enhancing the effectiveness of the water absorptive resin. However, the water absorptive tape is limited in its application and in its water blocking effectiveness. For example, the water absorptive tape is not suited for use inside a buffer tube, and the tape may not be effective to block the flow of water in small interstices of the cable. Moreover, application of the water absorptive tape requires special manufacturing equipment for wrapping the tape about the slotted core and then applying binders to hold the tape in place. Further, the water absorptive tape adds to the cost, size, and weight of the cable. Additionally, a craftsman will be obliged to perform the time consuming task of cutting and removing the binders and water absorptive tape in order to gain access to optical fibers in the cable.

The assignee hereof has developed a fiber optic cable which eliminates the necessity for a flooding or filling compound, and may eliminate the need for a water absorptive tape. U.S. Pat. No. 5,684,904 discloses a fiber optic cable having buffer tubes that include inner and/or outer coatings of a moisture-absorptive polymer. The moisture-absorptive polymer may be a mixture of a moisture-absorptive powder and a carrier resin. The carrier resin may be a thermoplastic, a thermally cross linked polymer, or a cured ultraviolet light curable resin. The moisture-absorptive polymer is described as one that has a rapid swelling speed; however, all of the moisture absorptive polymer may not swell when water enters the tube, as some of the moisture absorptive powder may be encapsulated in the carrier resin and therefore insulated from the water.

The water swellable materials as described in the foregoing disclosures may disadvantageously have a relatively low gel strength. Gel strength is indicative of the strength of the cross linking of the water absorptive polymer after the polymer has been exposed to water and gelation has occurred. A low gel strength may result in a flow of water around the gelled material, termed wicking. Wicking is especially likely to occur where the gel is resisting a head of water. Moreover, if the swell rate of the swellable material is too low, a substantial amount of water may migrate in the cable before the swellable material gels enough to block the flow of water.

OBJECTS OF THE INVENTION

In view of the foregoing, it is an object of the present invention to provide a fiber optic cable that includes a mixture of at least two distinct superabsorbent substances, one superabsorbent substance having a high gel strength and the other superabsorbent substance having a very fast swell rate.

It is a further object of the invention to provide a fiber optic cable having dry water blocking features which obviate the necessity for flooding and/or filling compounds.

BRIEF DESCRIPTION OF THE DRAWING FIGURES

FIG. 1 is an isometric view of a fiber optic cable according to the present invention.

FIG. 2 is a cross sectional view of the fiber optic cable of FIG. 1 taken along line 2—2.

FIG. 5 is an isometric view in partial cross section of an apparatus used to characterize the functional performance of superabsorbent substances used in fiber optic cables of the present invention.

FIG. 6 is a cross sectional view of an extrusion head for use in the making of fiber optic cable components in accordance with the present invention.

DETAILED DESCRIPTION OF THE INVENTION

Figure 3:
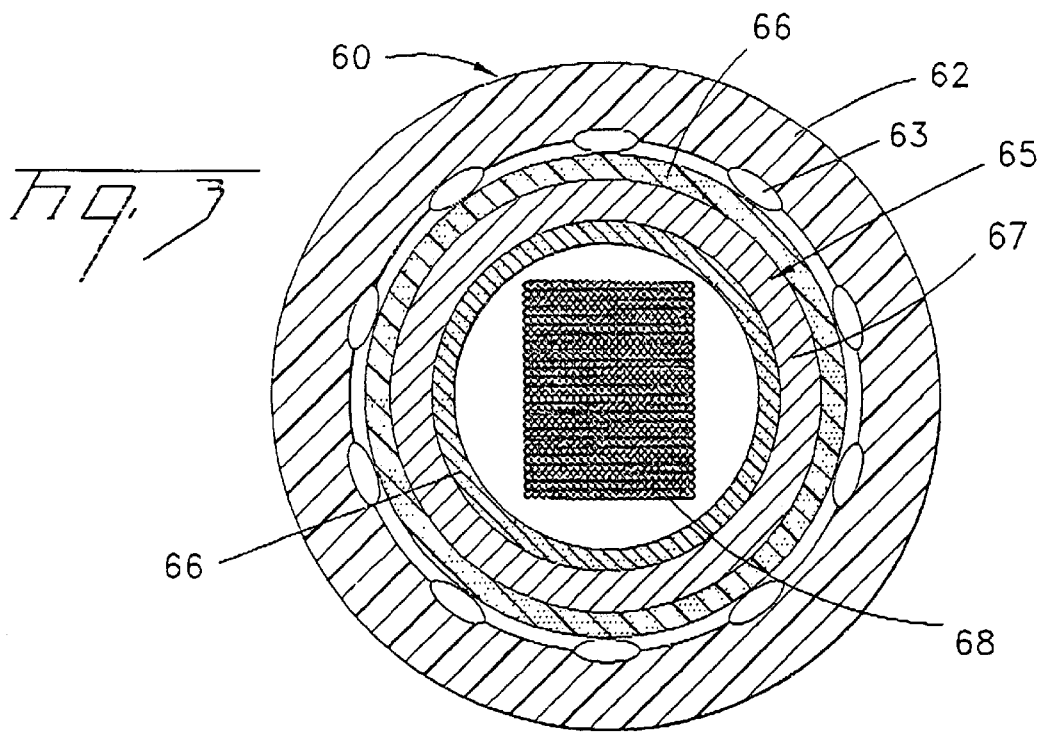
FIG. 3 is a cross sectional view of a second fiber optic cable according to the present invention.

Embodiments of the present invention include a fiber optic cable including at least one fiber optic cable component having two co-extruded layers, where one of the layers is a mixture of two water receptive agents. One of the water receptive agents is a mixture of two distinct superabsorbent substances, at least one of the superabsorbent substances is characterized by a very fast swelling rate whereby it is operative to quickly block the flow of water in a fiber optic cable, and the other superabsorbent substance is characterized by a high gel strength whereby it is operative to inhibit wicking of water in the cable. Another embodiment of the present invention includes a water receptive agent, with two distinct superabsorbent substances according to the present invention, that is extruded about a pre-formed fiber optic cable component. The other of the water receptive agents is a water receptive polymer, for example, a water soluble resin for enhancing the performance of the superabsorbent substances.

Referring to FIGS. 1–2, an exemplary fiber optic cable 10 according to the present invention will be described. Fiber optic cable 10 includes a core 20, a jacket 45, and a series of interstices S. Each interstice S includes a respective crush resistant member 30 and water swellable yarns 34,36.

Core 20 includes a central member 21 that may be surrounded by a water swellable tape 22. Fiber optic cable components comprising buffer tubes 25 surround tape 22, and each buffer tube 25 may include optical fiber ribbons 24 therein. Buffer tubes 25 comprise at least one water blocking layer 26 and a plastic layer 27. Buffer tubes 25 are preferably S-Z stranded about central member 21, and tube section 20 may be bound with a binder 29. According to the present invention, jacket 45 includes a water swellable layer 46, and a substrate comprising a plastic layer 47. Fiber optic cable 10 may include a conventional rip cord 43 and dielectric strength members 44.

FIG. 3 is a cross sectional view of a monotube type fiber optic cable 60 according to the present invention. Cable 60 includes an outer jacket 62, strength members 63, and a core tube 65 surrounding a stack of optical fiber ribbons 68. Core tube 65 may include one or more water blocking layers 66 according to the present invention, and a plastic layer 67. Fiber optic cable 60 may include other components as described in commonly assigned patent U.S. PAT. No. 5,561,729, which is hereby incorporated by reference in its entirety.

Figure 4:
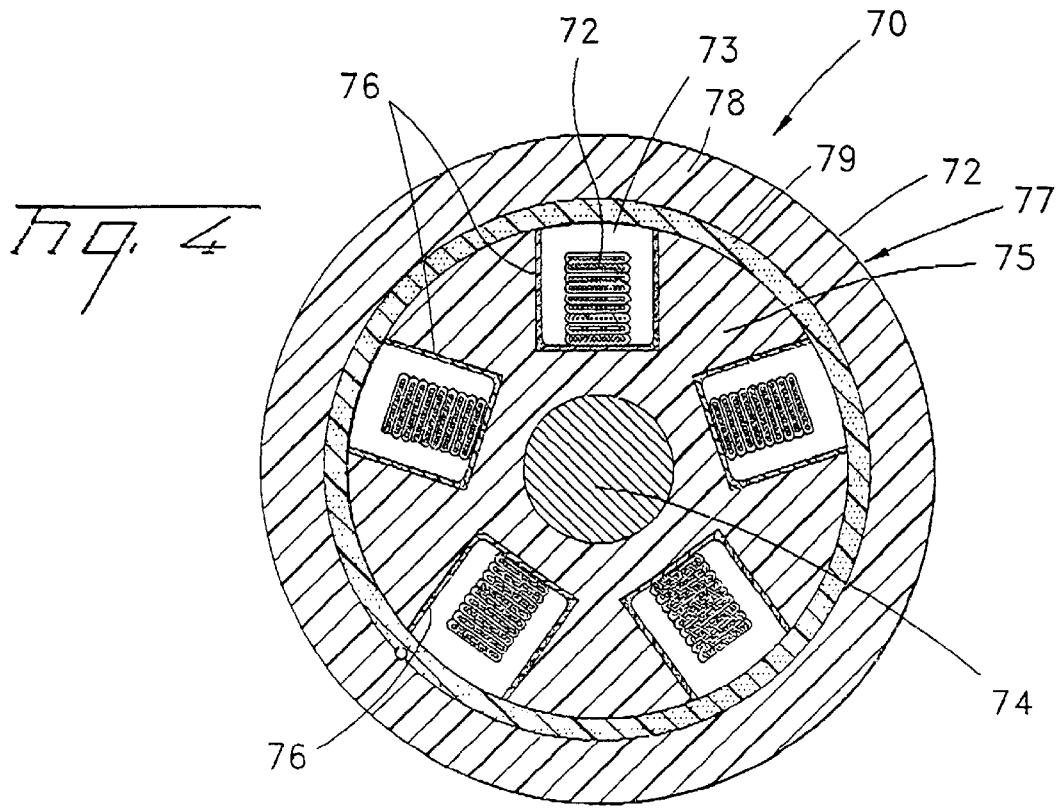
FIG. 4 is a cross sectional view of a third fiber optic cable according to the present invention.

FIG. 4 is a cross sectional view of a slotted rod type fiber optic cable 70 having a slotted rod 75 with a central member 74 and slots 73 having optical fiber ribbons 72 therein. Slots 73 may each include a layer 76 of water blocking material according to the present invention. Fiber optic cable 70 includes a jacket 77 having a layer of water blocking material 79 and a layer of plastic 78. Alternatively, layer 76 may coat the entire outer surface of slotted rod 75, in which event layer 79 may be unnecessary.

According to the present invention, each water blocking layer 26,46,66,76,79 of respective fiber optic cable components 25,45,65,75,77 is a thin layer of a compound of at least two water receptive agents. One of the water receptive agents is a water receptive polymer, and the other water receptive agent is a mixture of two or more superabsorbent substances. Water receptive polymers suitable for use in the present invention may be a commercially available hydrophilic resin, e.g. polyethylene oxide, or a water soluble hot melt compound, as supplied by the National Starch Company. Alternatively, the water receptive polymer may be a commercially available water absorptive plastisol-type material, e.g. as supplied by Fiber-line Inc. Furthermore, the water receptive polymer may comprise a water swellable coating that is cross linkable upon irradiation thereof with an ultraviolet (UV) light source, as described in U.S. Pat. No. 5,684,904, which patent is incorporated by reference herein in its entirety. The present invention contemplates the use of the foregoing polymers singly or in blends thereof.

As noted above, the other water receptive agent is a mixture of two or more superabsorbent substances. One of the superabsorbent substances is characterized by a very fast swell rate, i.e., it has a relatively lightly cross linked polymeric structure. The other superabsorbent substance is characterized by a high gel strength, i.e., it has a relatively highly cross linked polymeric structure. Suitable superabsorbent substances having a very fast swell rate are made commercially available by Sumitomo Chemicals, e.g. formulation No. J550, and by Chemdal Cabdry, e.g. formulation Nos. 130 or 150. Suitable superabsorbent substances having a high gel strength are made commercially available by Stockhausen, e.g. formulation Nos. 85-13 or 88-13 sieved. Additionally, either of the water receptive agents may include an anti-freeze chemical that is effective to depress the freezing point of water. Anti-freeze chemicals are disclosed in U.S. Pat. No. 5,410,629, U.S. Pat. No. 5,321,788, and U.S. Pat. No. 4,401,366, which patents are hereby incorporated by reference.

To characterize superabsorbent components suitable for use with the present invention, experiments utilizing a swellability apparatus 100 (FIG. 5) were conducted. Swellability apparatus 100 includes a cup 102, a perforated plate 104, a piston 106, and a displacement gauge 108. Samples S of a superabsorbent substance having a mass of about 0.2 g were sequentially placed in cup 102 with perforated plate 104 placed thereover. Next, water was poured into cup 102 and the water flowed into the holes of perforated plate 104 and contacted the samples. The water was absorbed by and caused the gelation of each sample S which resulted in the swelling of each sample. As each sample swelled, perforated plate 104 moved toward gauge 108 which caused piston 106 to move in the same direction. Displacement gauge 108, which is operatively associated with piston 106, measured the displacement of piston 106 for each sample. The displacement measurement was recorded for each sample S at 60 and 120 seconds.

Each sample was evaluated in a relatively low and a relatively high swell resistance context. The combined mass of piston 106 and plate 104 created a relatively low swell resistance. A relatively higher swell resistance context was created for each sample by adding a mass (not shown) to plate 104 thus creating a pressure of about 0.3 psi. As observed in the relatively low resistance context, the samples having the very fast swell rate super absorbent substances had a displacement range of about 5.8 to 14.4 mm but, in the high resistance context, they had a displacement range of only about 0.8 to 3.0 mm. As observed in the relatively low resistance context, the samples having the high gel strength super absorbent substances had a displacement range of only about 6.7 to 9.3 mm but, in the high resistance context, they had a displacement range of about 2.9 to 4.2 mm.

The foregoing characterization experiments show that where the fast swell rate superabsorbent substance encounters a relatively low swell resistance, it reaches a much higher displacement sooner than the substance that is characterized by a high gel strength. On the other hand, where the high gel strength superabsorbent substance encounters a relatively higher swell resistance, it reaches a higher displacement sooner than the fast swell rate substance.

According to the present invention, a superabsorbent substance characterized by a very fast swell rate preferably has a displacement in the relatively low resistance context of at least. 5.0 mm at 120 seconds. The superabsorbent component characterized by a high gel strength preferably has a displacement range of at least about 3.0 mm in the high resistance context at 120 seconds. Operation of layers 26,46, 66,76,79 in the presence of water will now be described. When water comes into contact with, for example, the water soluble resin, it gradually dissolves the resin thereby releasing the superabsorbent substances for the formation of gel.

The fast swell rate superabsorbent substance advantageously quickly reacts to block the flow of water, and the high gel strength superabsorbent substance swells at a slower rate but is operative to prevent wicking.

According to a manufacturing aspect of the present invention, fiber optic cable components 25,45,65,75,77 are formed by the co-extrusion of layers 26,46,66,76,79 with at least one other respective plastic layer 27,47,67,75,78. For example, buffer tube 25 (FIG. 2) includes at least one layer 26 that includes the two distinct water receptive agents according to the present invention. Layer 26 is co-extruded with a plastic layer 27 formed of, for example, a polypropylene copolymer, polybutylene terephtalate, or Nylon. With reference to FIG. 6, co-extrusion of layers 26,27 may be accomplished by the use of a co-extrusion type die 200 having at least two inlet ports 202,204. The material with two water receptive agents that will form layer 26 is fed under pressure and heat through inlet port 202. The material of plastic layer 27 is fed under pressure and heat to inlet port 204. Layer 26 and plastic layer 27 are thereby simultaneously extruded to define a buffer tube 25 about ribbon stack 24. Extrusion head 200 may be adapted to include a third inlet port (not shown) whereby a second layer 26 having two distinct water receptive agents according to the present invention may be co-extruded about the exterior of plastic layer 27.

The skilled artisan may, without undue experimentation, adapt the dimensions of extrusion head 200 to fabricate other fiber optic cable components. With reference to the embodiment of FIGS. 1–2, jacket 45 is formed by the co-extrusion of layers 46,47. Layer 47 may include, for example, a polyethylene or a polyvinyl chloride material. In the embodiment shown in FIG. 3, core tube 65 includes co-extruded layers 66,67. Layer 67 may comprise, for example, a polypropylene copolymer, a polybutylene terephtalate, or a Nylon material. With reference to the embodiment of FIG. 4, a slotted rod type die according to co-pending application Ser. No. 617,710, now U.S. Pat. No. 5,830,517, to Clarke et al filed Mar. 21, 1997, which is incorporated herein by reference, may be adapted to co-extrude a slotted rod 75 with layers 76 in slots 73. Slotted rod 75 may be formed of, for example, a polypropylene copolymer, a polybutylene terephtalate, polyethylene, or a Nylon material.

Figure 7:
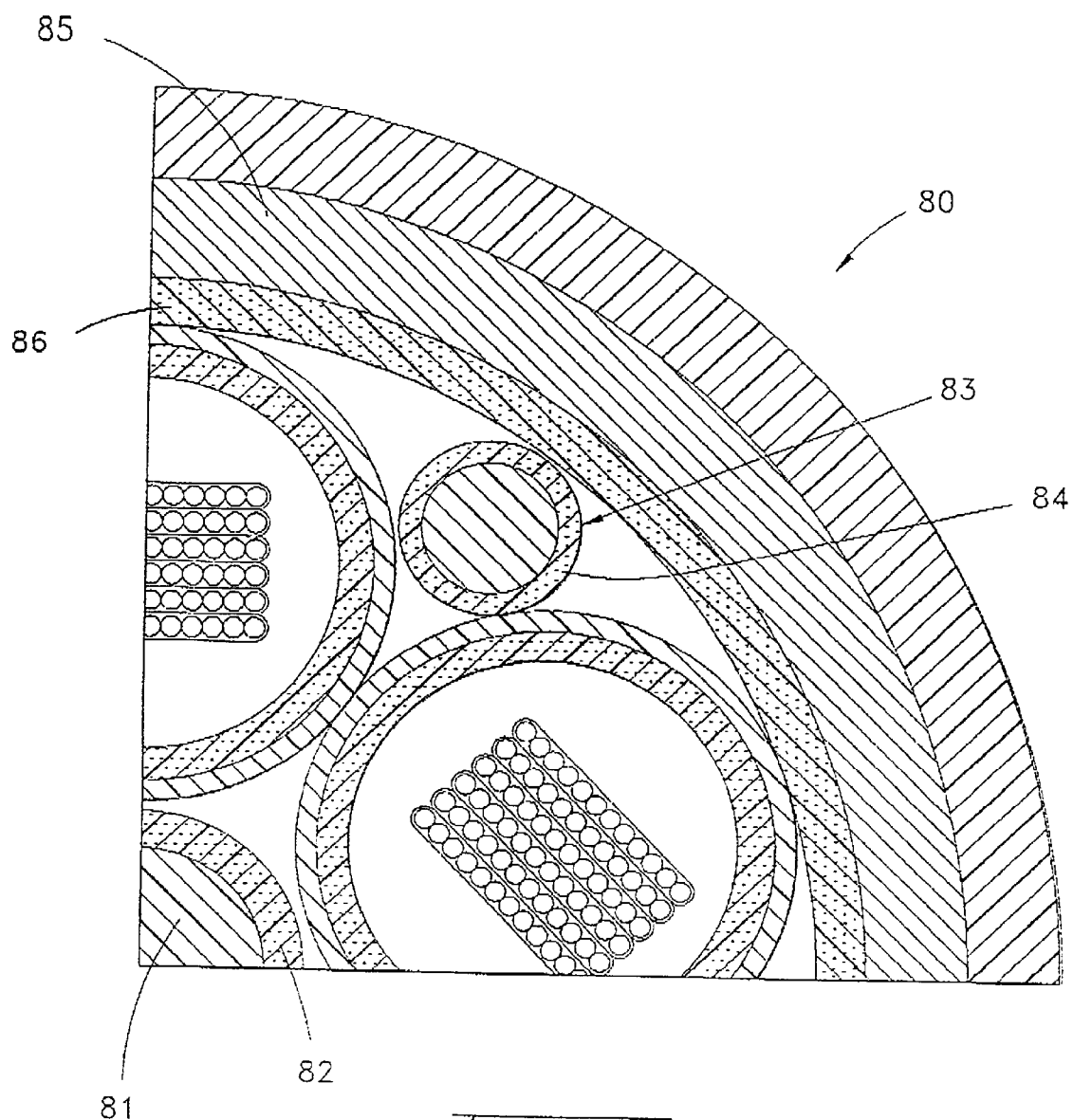
FIG. 7 is a quarter section of a fourth fiber optic cable according to the present invention.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. As an alternative to co-extrusion, the water receptive substances of the present invention may, under suitable heat and pressure, be pumped onto a cable component. Although the present invention has been described with reference to the co-extrusion of two or more layers, a layer of material having two water receptive agents, according to the present invention, may be extruded about a pre-formed fiber optic cable component, e.g. a filler rod or a central member. For example, with reference to FIG. 7, the present invention may be practiced in the form of a fiber optic cable 80 having a central member 81 with an extruded water blocking layer 82 including water receptive agents, and a filler rod 83 with an extruded water blocking layer 84 thereon. Additionally, fiber optic cable 80 may include an armor tape 85 having a water blocking layer 86 applied thereto by the spraying or extrusion of the material thereon. In the presence of water, layers 82,84,86 behave as in the foregoing embodiments, i.e., the fast swell rate superabsorbent substance advantageously quickly reacts to block the flow of water, and the high gel strength superabsorbent substance is operative to prevent wicking. Moreover, water receptive agents according to the present invention may be applied to other cable components, for example, tensile strength members, anti-buckling members, optical fibers and optical fiber ribbons, foamed substrates, porous substrates, non-woven tapes, or non-porous sheet material. Further, the water receptive substance having the super absorbent substances may be compounded with a polypropylene or other thermoplastic resin and extruded in a conventional die to form a single layer buffer tube 25a, e.g. as shown in FIG. 2.

Accordingly, what is claimed is:

1. A fiber optic cable, comprising:
   at least one optical fiber; and a fiber optic cable component including at least one water receptive agent, said water receptive agent including a mixture of at least two distinct superabsorbent substances, at least one of said superabsorbent substances characterized by a cross linked polymeric structure causing a very fast swelling rate whereby it is operative to swell at a rapid rate to quickly block the flow of water in said cable, and the other of said superabsorbent substances characterized by a cross linked polymeric structure causing a high gel strength whereby it is operative to inhibit wicking, the cross linking structure of the fast swelling rate substance being lighter than the cross linking structure of the high gel strength substance:
   a. the fast swell rate superabsorbent substance, when encountering a relatively low swell resistance, reaching a higher displacement sooner than said high gel strength substance under a similar low swell resistance; and
   b. said high gel strength superabsorbent substance, when encountering a relatively higher swell resistance, generally reaching a higher displacement sooner than the fast swell rate substance under a similar higher swell resistance.

2. The fiber optic cable of claim 1, wherein said water receptive agent is compounded with another water receptive agent.

3. The fiber optic cable of claim 2, wherein said another water receptive agent comprises a hydrophilic resin.

4. The fiber optic cable of claim 2, wherein said another water receptive agent comprises a water soluble resin.

5. The fiber optic cable of claim 2, wherein said another water receptive agent comprises a plastisol material.

6. The fiber optic cable of claim 2, wherein said another water receptive agent comprises a UV cured resin.

7. The fiber optic cable of claim 1, wherein said water receptive agent is disposed in a layer co-extruded with a plastic layer.

8. The fiber optic cable of claim 7, wherein said plastic layer includes polypropylene.

9. The fiber optic cable of claim 1, wherein said fiber optic cable component is a buffer tube.

10. The fiber optic cable of claim 1, wherein said fiber optic cable component is a cable jacket.

11. The fiber optic cable of claim 1, wherein said fiber optic cable component is a core tube.

12. The fiber optic cable of claim 1, wherein said fiber optic cable component is a slotted rod.

13. The fiber optic cable of claim 1, wherein said fiber optic cable component is a central member.

14. The fiber optic cable of claim 1, wherein said fiber optic cable component is a crush resistant member.

15. The fiber optic cable of claim 1, wherein said fiber optic cable component is a tape.

16. The fiber optic cable of claim 1, wherein said fiber optic cable component is an anti-buckling member.

17. The fiber optic cable of claim 1, wherein said fiber optic cable component is a filler rod.

18. The fiber optic cable of claim 1, wherein said fiber optic cable component is a tensile strength member.

19. The fiber optic cable of claim 1, wherein said water receptive agent is compounded with a plastic to form a single layer buffer tube component.

* * * * *